US010527854B1

(12) United States Patent
Trail (10) Patent No.: US 10,527,854 B1
(45) Date of Patent: Jan. 7, 2020

(54) ILLUMINATION SOURCE FOR A WAVEGUIDE DISPLAY

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 18 days.

(21) Appl. No.: 16/011,290

(22) Filed: Jun. 18, 2018

(51) Int. Cl.
| G06F 3/01 | (2006.01) |
| G02B 27/01 | (2006.01) |
| H04B 10/70 | (2013.01) |
| G02B 27/12 | (2006.01) |
| G02B 6/12 | (2006.01) |

(52) U.S. Cl.
CPC ......... *G02B 27/0172* (2013.01); *G02B 27/12* (2013.01); *G06F 3/013* (2013.01); *H04B 10/70* (2013.01); *G02B 2006/1215* (2013.01); *G02B 2027/0178* (2013.01)

(58) Field of Classification Search
USPC .................................................. 345/156, 690
See application file for complete search history.

(56) References Cited

U.S. PATENT DOCUMENTS

| 10,393,930 | B2 * | 8/2019 | Tervo | G02B 5/1842 |
| 2002/0126339 | A1 * | 9/2002 | Sato | H04B 10/077 398/9 |
| 2008/0297894 | A1 * | 12/2008 | Kim | G02B 6/0078 359/454 |
| 2012/0032200 | A1 * | 2/2012 | Kwon | H01L 33/50 257/88 |
| 2016/0164251 | A1 * | 6/2016 | Yashiki | G02B 6/4204 385/2 |
| 2016/0209657 | A1 * | 7/2016 | Popovich | G02B 27/017 |
| 2018/0113309 | A1 * | 4/2018 | Robbins | G02B 27/0172 |
| 2018/0254832 | A1 * | 9/2018 | Onaka | H04B 10/532 |
| 2018/0275410 | A1 * | 9/2018 | Yeoh | H04N 13/344 |
| 2019/0004219 | A1 * | 1/2019 | Tervo | G02B 5/18 |
| 2019/0172868 | A1 * | 6/2019 | Chen | H01L 27/14652 |
| 2019/0212827 | A1 * | 7/2019 | Kin | G02B 27/0093 |
| 2019/0212828 | A1 * | 7/2019 | Kin | G02B 27/017 |
| 2019/0227315 | A1 * | 7/2019 | Sun | G02B 5/20 |
| 2019/0227316 | A1 * | 7/2019 | Lee | G02B 5/1852 |

(Continued)

*Primary Examiner* — Tony O Davis
(74) *Attorney, Agent, or Firm* — Fenwick & West LLP (57) ABSTRACT

A near eye display (NED) that includes an illumination source including a photonic array. The photonic array includes at least one waveguide that divides light from one or more emitters into a number of channels, and outputs the divided light using a plurality of outputs. An optical switching assembly includes a one or more input ports and a plurality of output ports. The optical switching assembly is configured to map light from the one or more input ports to the plurality of outputs. In various embodiments, the optical switching assembly is additionally configured to control the relative illumination, timing, and phase of light produced by each of the plurality of outputs. The optical switching assembly selectively outputs some or all of the incoupled light via output ports of the plurality of output ports in accordance with instructions from a controller, the outcoupled light forming a light pattern.

20 Claims, 6 Drawing Sheets

(56) References Cited

U.S. PATENT DOCUMENTS

| | | | |
|---|---|---|---|
| 2019/0227319 A1* | 7/2019 | Trail | G02B 6/12007 |
| 2019/0227320 A1* | 7/2019 | Bonar | G02B 6/0026 |
| 2019/0227321 A1* | 7/2019 | Lee | G02B 5/18 |
| 2019/0227322 A1* | 7/2019 | Schaub | G02B 26/0816 |
| 2019/0230306 A1* | 7/2019 | Liu | H04N 5/35554 |

* cited by examiner

ILLUMINATION SOURCE FOR A WAVEGUIDE DISPLAY

BACKGROUND

The present disclosure generally relates to artificial reality systems and more specifically relates to an illumination source for a waveguide display.

Illumination sources used in displays for virtual reality (VR) systems or augmented reality (AR) systems, require a combination of features in order to be viable. These features include form-factor, brightness, and efficiency. Currently available illumination sources fail to meet the ultimate form-factor or performance needs of VR and AR systems. To meet the form factor and performance requirements of VR and AR system, sources with gain (e.g., laser diode) are promising. However, the use of sources with gain introduces a new limitations such as performance specifically due to speckle and interference.

SUMMARY

A photonic array for generating a light pattern. The photonic array includes a waveguide and an optical switching assembly. The waveguide includes one or more inputs and a plurality of outputs. The waveguide is configured to receive light at the one or more inputs (e.g., from one or more emitters), divide the received light into a number of channels, and output the divided light using at least some of the plurality of outputs. The optical switching assembly includes a one or more input ports and a plurality of output ports. The optical switching assembly is configured to map light from the one or more input ports to the plurality of outputs (e.g., 1 input to a 1000 outputs). The optical switching assembly incouples the light from the plurality of outputs at corresponding input ports of the plurality of input ports. The optical switching assembly is configured to selectively output some or all of the incoupled light via output ports of the plurality of output ports in accordance with instructions from a controller, the outcoupled light forming a light pattern. In various embodiments, the optical switching assembly is additionally configured to control the relative illumination, timing, and phase of light produced by each of the plurality of outputs. In some embodiments, the photonic array may be part of a near eye display (NED), which includes one or more emitters.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone NED, a mobile device or computing system, or any other hardware platform capable of providing artificial reality content to one or more viewers.

A NED comprises a display assembly including an illumination source and put waveguide. The illumination source includes one or more emitters configured to emit a light and a photonic array configured to generate a portion of a light pattern. In some embodiments, the display assembly also includes at least one scanning mirror configured to scan the portion of the light pattern in at least one dimension to generate an image light.

The photonic array includes one or more photonic circuits. A photonic circuit maps source input(s) to outputs, to generate a light pattern that would be utilized in a NED. The light pattern may be one-dimensional (1D) or two-dimensional (2D). A photonic circuit includes a waveguide and an optical switching assembly. The waveguide is configured to receive light emitted by the one or more emitters. The waveguide includes a branching region that terminates at a plurality of outputs, and the plurality of outputs act as a plurality of light sources for the display. The branching region divides the received light into a number of channels (i.e., splits the light received from the waveguide a plurality of times before outputting the light). The branching region is configured to propagate light from the at least one input to each of the outputs via, for example, total internal reflection.

The optical switching assembly generates a switched light pattern based on the light received from the outputs of the branching region. The optical switching assembly includes a one or more input ports (one for every output of the branching region) and a plurality of output ports. Each input port provides light to at least one (and in some cases more than one) corresponding output port. The geometry of the switched light pattern (e.g., 1D or 2D) depends on the physical arrangement of the output ports. And the geometry of the output ports can vary from the geometry of the input ports. For example, the input ports could be arranged in 1D (i.e., a line), and the output ports could be arranged in 2D (e.g., a staggered line with some height in order to allow more room and space for the connecting traces). The optical switching assembly switches the light based on one or more display instruction from a controller. Each output port has a corresponding state that is set by the controller. A state may be an active state or an inactive state. If an output port is in an active state, it transmits light from its corresponding input port. If an output port is in an inactive state, it does not transmit light from its corresponding input port. The controller is able to dynamically control which output ports emit light by controlling the state of each of the output ports.

In some embodiments, the switched portion of the light pattern is scanned by a scanning mirror to generate an image light. The arrangement of the one or more outputs determines the geometry of the light pattern emitted by the photonic circuit. For example the one or more outputs may be arranged in a single line to form a 1D light pattern or arranged in rows of multiple lines to form a 2D light pattern.

In some embodiments, a portion of the light pattern is scanned along one or more axes to generate image light. The image light is incoupled into an output waveguide and directed towards an eyebox. Note that in some embodiments, there is no scanning mirror and the optical switching assembly forms image light in a 2D light pattern, and the 2D light pattern corresponds to the entire image (v. portions of an image which are scanned to make an entire image).

In some embodiments, a plurality of waveguides may be layered to form a full color display. For example, each waveguide may be for a different color channel (e.g., red, green, blue). In some embodiments, multiple waveguides may share a single optical switching assembly. In other embodiments, each waveguide may include its own optical switching assembly.

System Overview

Figure 1:
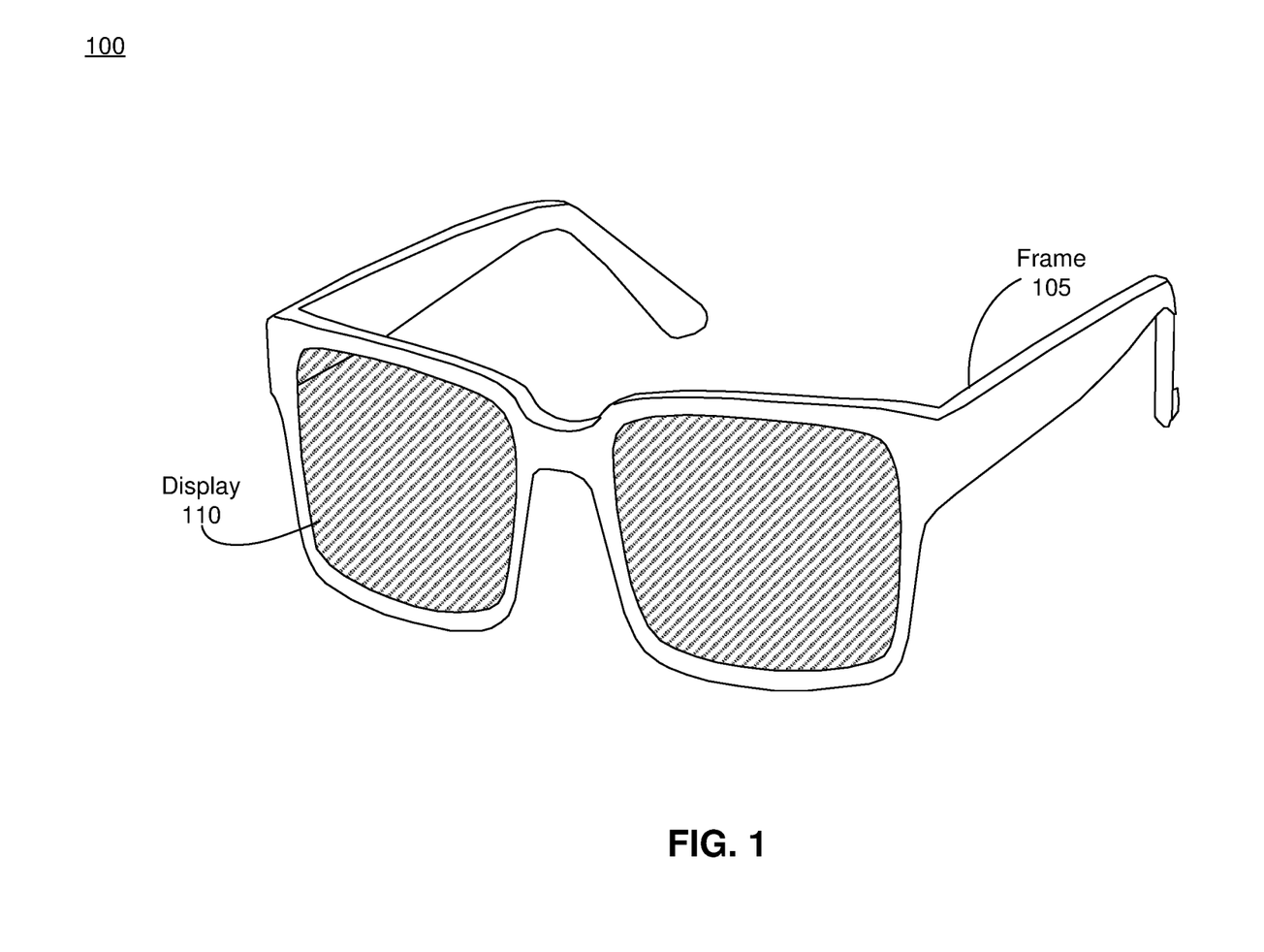
FIG. 1 is a diagram of a near-eye-display (NED), in accordance with one or more embodiments.

FIG. 1 is a diagram of a NED 100, in accordance with one or more embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. The display 110 receives image light from a local area being viewed by a user and light generated by an illumination source in order to display images to a user. In an embodiment the display 110 includes one or more optical elements configured to adjust the field of view and adjust the accommodation. The display 110 is further described below in conjunction with FIG. 1 and is further described below in conjunction with FIGS. 2-5.

Figure 2:
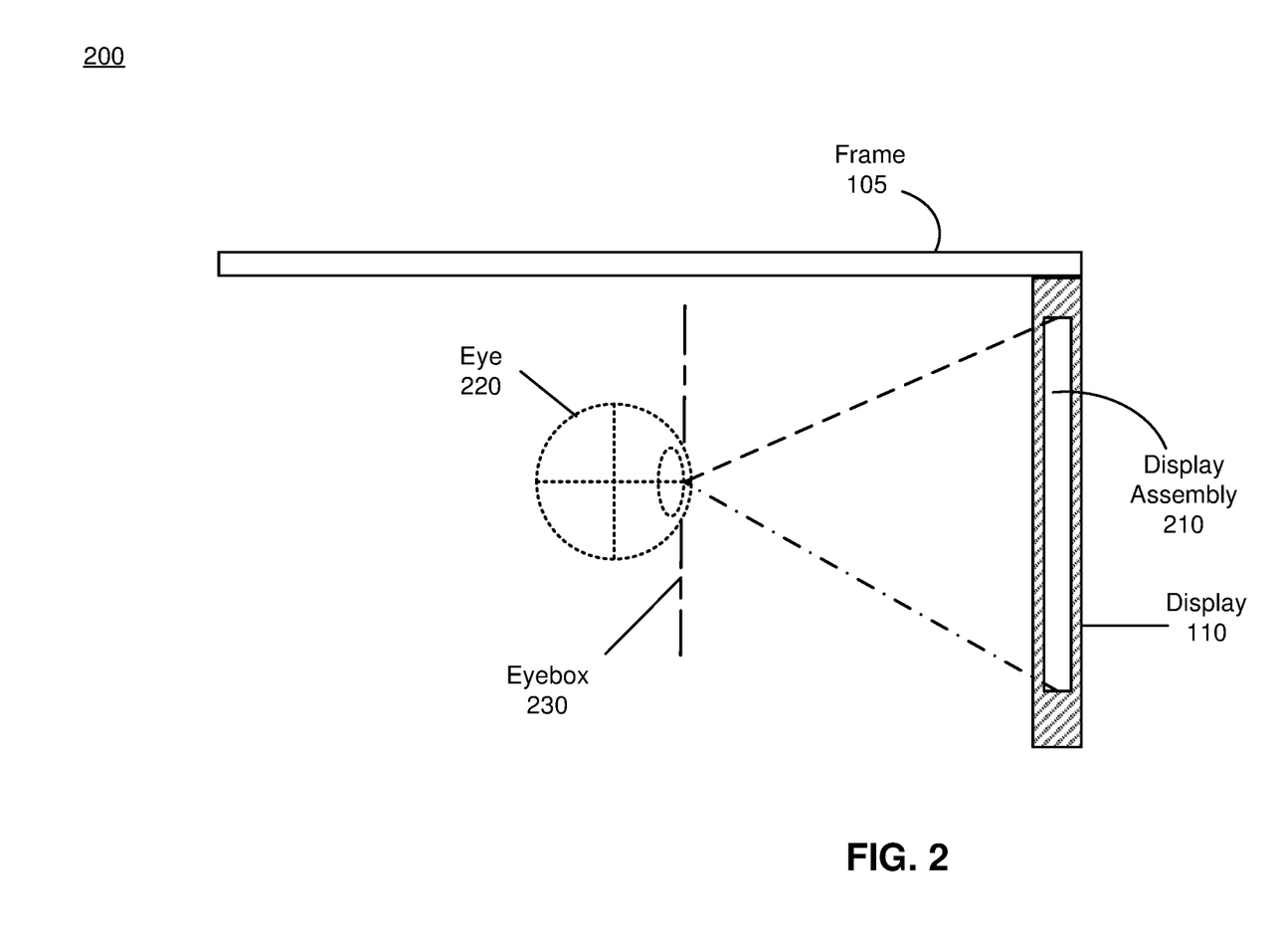
FIG. 2 is a cross-section of the NED illustrated in FIG. 1, in accordance with one or more embodiments.

FIG. 2 is a cross section 200 of an eyewear of the NED 100 illustrated in FIG. 1, in accordance with one or more embodiments. The cross section 200 includes at least one display assembly 210 integrated into the display 110, and an eyebox 230. The eyebox 230 is a location where an eye 220 is positioned when a user wears the NED 200. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210 is configured to generate image light and direct the image light to the eyebox 230. In some embodiments, when the NED 200 is configured as an AR NED and/or MR NED and the display assembly 210 directs light from a local area surrounding the NED 200 to the eyebox 230.

The display assembly 210 includes a waveguide display configured to display an image for viewing by the user. The display assembly 210 includes a waveguide display including one or more photonic circuits configured to generate a light pattern. The generated light pattern is emitted towards an eye 220 of the user. Embodiments of a waveguide display are further described below in conjunction with FIGS. 3-5.

The display assembly 210 may be composed of one or more materials (e.g., plastic, glass, etc.) with one or more refractive indices that effectively minimize the weight and widen a field of view of the NED 200. In alternate configurations, the NED 200 includes one or more optical elements between the display assembly 210 and the eye 220. The optical elements may act to, e.g., correct aberrations in image light emitted from the display assembly 210, magnify image light, perform some other optical adjustment of image light emitted from the display assembly 210, or some combination thereof. The optical elements may include, for example, an aperture, a Fresnel lens, a convex lens, a concave lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210.

Figure 3:
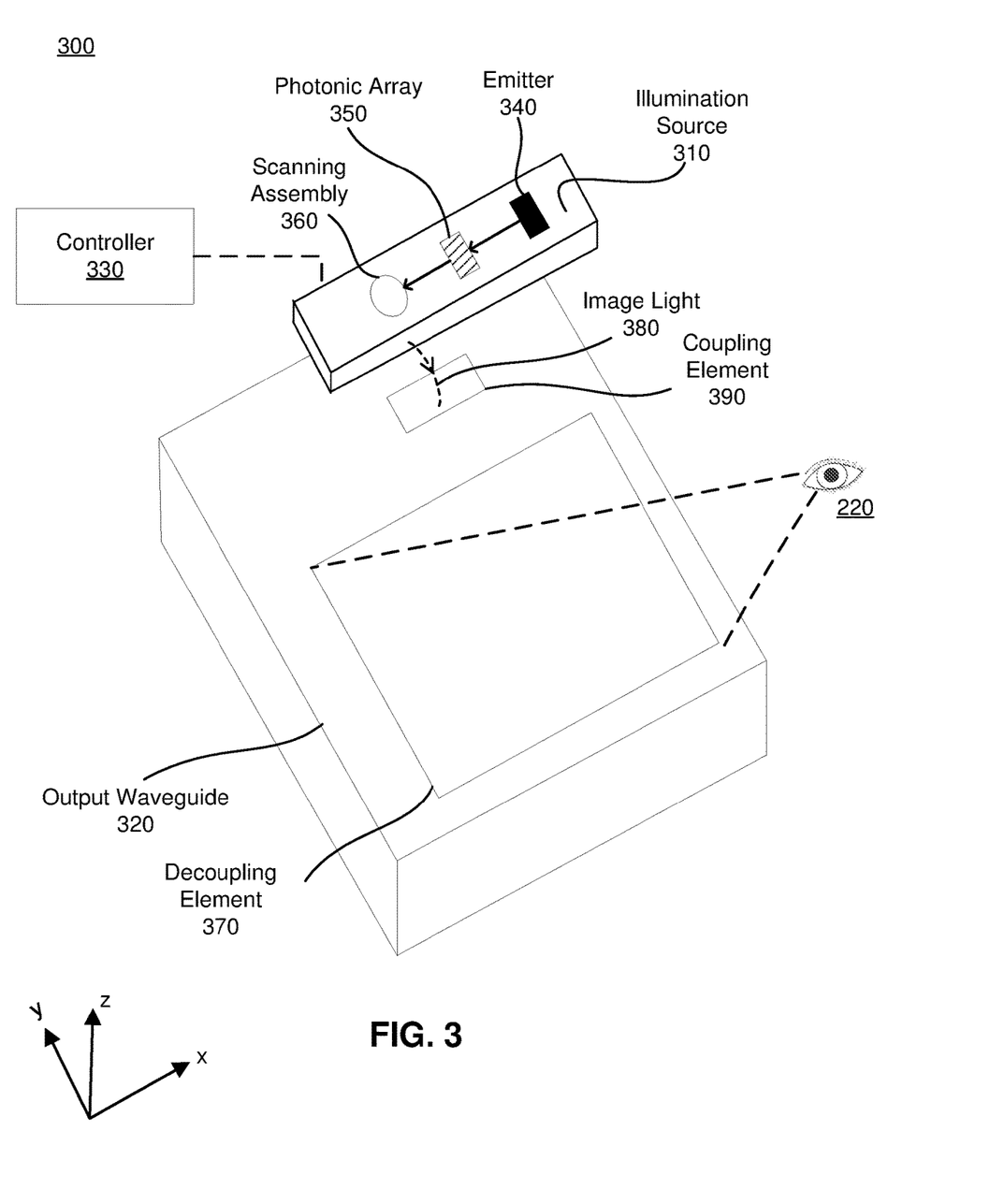
FIG. 3 illustrates an isometric view of a waveguide display, in accordance with one or more embodiments.

FIG. 3 illustrates an isometric view of a waveguide display 300, in accordance with one or more embodiments. The waveguide display 300 comprises an illumination source 310, an output waveguide 320, and a controller 330. In some embodiments, the waveguide display 300 is a component (e.g., display assembly 210) of the NED 200. In alternate embodiments, the waveguide display 300 is part of some other NED, or other system that directs display image light to a particular location.

For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The illumination source 310 generates an image light 380. In various embodiments, the illumination source 310 includes an emitter 340, a photonic array 350, and a scanning assembly 360. The illumination source 310 emits an image light 380 having certain characteristics. A characteristic is a feature that describes light emitted from the emitter 340 associated with the illumination source 310. In an example embodiment, a characteristic of light describes its polarization, wavelength, amplitude, temporal modulation, or some other feature that describes emitted light. While the embodiment of the illumination source 310 depicted in conjunction with FIG. 3 includes a scanning assembly 360, in some embodiments, the illumination source 310 does not include a scanning assembly 360 and the photonic array is configured to directly produce the image light 380.

The emitter 340 may be one or more individual emitters. Each of the one or more individual emitters emits light with the same characteristic. Here, example bands of light emitted by the illumination source 310 include: a visible band (e.g., ~380 nm to 750 nm), an infrared (IR) band (e.g., ~750 nm to 1500 nm), an ultraviolet band (e.g., 100 nm to 380 nm), another portion of the electromagnetic spectrum, or some combination thereof. In various embodiments, each of the one or more emitters is a diode laser, or a micro light emitting diode (μLED). In other embodiments, the emitter 340 is a multiple emitter laser. Multiple emitter lasers are described in U.S. application Ser. No. 15/232,073 which is incorporated by reference in its entirety herein.

In one embodiment, the one or more emitters 340 could be a vertical-cavity surface-emitting laser (VCSEL) or a VCSEL array. In another embodiment, the plurality of emitters could be an array of single-mode edge emitter lasers. A common substrate is used to hold the plurality of emitters as part of the illumination source, allowing for precise determinations of each emitter location. Moreover, because the emitters are on the same substrate, made in the same or similar process steps, and are very close together, they are resilient to temperature change (where large temperature swings can be calibrated out easier), process variations, and environment shocks/impacts. For example, the one or more emitters is three lasers capable of emitting light in the red, green, and blue (RGB) portions of the visible spectrum. In various embodiments, light emitted by the one or more emitters is received by a photonic array.

In various embodiments, the emitter 340 comprises a first emitter and a second emitter. Here, the first emitter is configured to emit light in a first band and the second emitter is configured to emit light in a second band that is different than the first band. In these embodiments, the scanning assembly 360 is configured to condition image light emitted by both the first emitter and the second emitter. It should be noted that while the emitter 340 discussed herein only includes a first emitter and a second emitter, in other embodiments, the emitter 340, includes a plurality of emitters each of which may emit light in a variety of different bands of the electromagnetic spectrum.

The photonic array 350 is configured to receive light from the one or more emitters and emit a light pattern towards the scanning assembly 360. Here, the photonic array 350 receives image light from the emitter 340. In an embodiment, the photonic array 350 additionally comprises one or more optical elements configured to coupled light emitted by the emitter 340 into the photonic array 350. For example, the photonic array 350 may include on or more prisms, grating couplers, lenses, or some combination thereof.

The photonic array 350 may comprise one or more photonic circuits wherein each of the one or more photonic circuits comprises at least one optical input and two or more optical outputs. In some embodiments, a photonic circuit is configured to fan-out the received image light 380 to form a light pattern. The light pattern may be 1D pattern (e.g., similar to a line source) or a 2D pattern. In various embodiments, the light pattern emitted by a photonic circuit 350 is controllable (e.g., via a voltage or a current provided by a controller 330). That is, each photonic circuit of the one or more photonic circuits associated with the photonic array 350 generates a controllable 1D or 2D light pattern. The light pattern geometry is generally comprises n×N pixels, where n is a number of rows of pixels and N is a number of columns of pixels). It should be noted that a 1D light pattern generated by a photonic circuit is functionally a line of pixels, and that 2-D patterns can have aspect ratios similar to a 1D light pattern, for example 2×50. The 2D pattern may also have a more square or rectangular geometry, e.g., 25 pixels×25 pixels, 1000 pixels×5000 pixels, etc. In some embodiments, the 1D or 2D light pattern may act as a linear light source along a first dimension (e.g., y-dimension) but still have dimensional spreading along a different axis (e.g., along z-dimension). For example, even numbered light sources (e.g., pixels) in a row (e.g., along y-dimension) may be offset vertically (e.g., z-dimension) from odd numbered light sources in the same row and/or in adjacent rows. The offset can facilitate fitting the light sources close together while maintaining confinement of optical modes of light emitted by each of the light sources. Photonic circuits are further described below in conjunction with FIGS. 4 and 5.

In various example embodiments, where the photonic array 350 generates a portion of a 2D light pattern, the illumination source 310 additionally includes the scanning assembly 360. The scanning assembly 360 includes one or more mirrors that scan the light pattern generated by a photonic array 350 in at least one dimension. In an embodiment, the scanning assembly 360 generates a frame by raster scanning the light pattern generated by a photonic array 350. For example the scanning assembly 360 sweeps the light pattern from left to right at a steady rate, then inactivates and rapidly moves back to the left where the photonic circuit activates and sweeps out the next line of the frame. In an embodiment, while inactivated the vertical position is also steadily increases (e.g., downward). In other embodiments, the scanning assembly 360 may sweep the light pattern in different arrangements. For example, the scanning assembly 360 scans the light pattern generated by the photonic array 350 right to left, bottom to top, or any combination thereof.

The scanning assembly 360 is configured to scan a light pattern generated by the photonic array 350 (e.g., along one or more axis) to generate an image light. In embodiments where the photonic array 350 generates a 1D or a 2D light pattern, the scanning assembly 360 scans the 1D light pattern along the X and/or Y axis to form image light 380. In various embodiments, the scanning assembly 360 additionally includes one or more optical elements (e.g., lenses, prisms, diffraction grating, or any combination thereof.) to correct the light pattern generated by the photonic array 350.

Note in some embodiments the waveguide display 300 does not include a scanning assembly 360 and the photonic array 350 generates a 2D light pattern. The 2D light pattern may correspond to the entire image. In some embodiments, the 2D light pattern corresponds to a portion of an image and the waveguide display 300 includes a scanning assembly 360 to scan the 2D light pattern to generate an entire image.

The output waveguide 320 is an optical waveguide that outputs image light 380 to an eye of a user (e.g., eye 220). The output waveguide 320 receives the image light 380 via the coupling element 390 and expands image light 380 in one or more dimensions (e.g., via pupil replication) and outputs the expanded light using the decoupling element 370. In various embodiments the coupling element 390 and the decoupling element 370 may be, e.g., a diffraction grating, a holographic grating, one or more cascaded reflectors, one or more prismatic surface elements, an array of holographic reflectors, some other structure that couples light to/from the output waveguide 320, or some combination thereof.

The output waveguide 320 may be composed of one or more materials that facilitate total internal reflection of the image light 380. The output waveguide 520 may be composed of e.g., silicon, plastic, glass, various polymers, or some combination thereof. In various embodiments, the output waveguide 320 has a small form factor. For example, the output waveguide 320 may be approximately 50 mm while along the X-dimension, 30 mm long along the Y-dimension, and 0.5-3 mm along the Z-dimension.

In some embodiments, the waveguide display 300 is one of a plurality of waveguide displays that are stacked to form a stacked waveguide display. In some embodiments, each waveguide display of a stacked waveguide display has its own dedicated components. In other embodiments, some components are shared across some or all of the waveguide displays (e.g., a single output waveguide is used). In some embodiments, each waveguide display in the stacked waveguide display is substantially the same except that they each are modified to emit image light at a different wavelength. For example a first waveguide display in a stacked waveguide display emits light in a first color (e.g., red), a second waveguide display in the stacked waveguide display emits light in a second color (e.g., blue), and a third waveguide display in the stacked waveguide display emits light in a third color (e.g., green). The stacked waveguide display may be configured to combine light emitted by each of the one or more waveguide displays comprising the stacked waveguide display. A stacked waveguide display is further described in U.S. patent application Ser. No. 15/495,373 which is incorporated in its entirety herein.

The controller 330 controls operation of the waveguide display 300 (and/or each waveguide display in a stacked waveguide display) such that it outputs a particular light pattern. The controller 330 determines and provides instructions to the light source 310, the photonic array 320, the scanning assembly 360, or some combination thereof, based on display instructions. The instructions may include, e.g., a type of a source of image light (e.g. monochromatic, polychromatic), a scanning rate, an orientation of a scanning assembly associated with the output waveguide 320, control which output ports are active in one or more optical switching assemblies of the photonic array 350, or some combination thereof. Moreover, embodiments where there is a stacked waveguide display, the instructions control each of the waveguide displays within the stacked waveguide display. Display instructions are instructions to render one or more images. In some embodiments, display instructions may simply be an image file (e.g., bitmap). The display instructions may be received from, e.g., a console of an artificial reality system. The controller 330 may include a combination of hardware, software, and/or firmware not shown here so as not to obscure other aspects of the disclosure.

Figure 4:
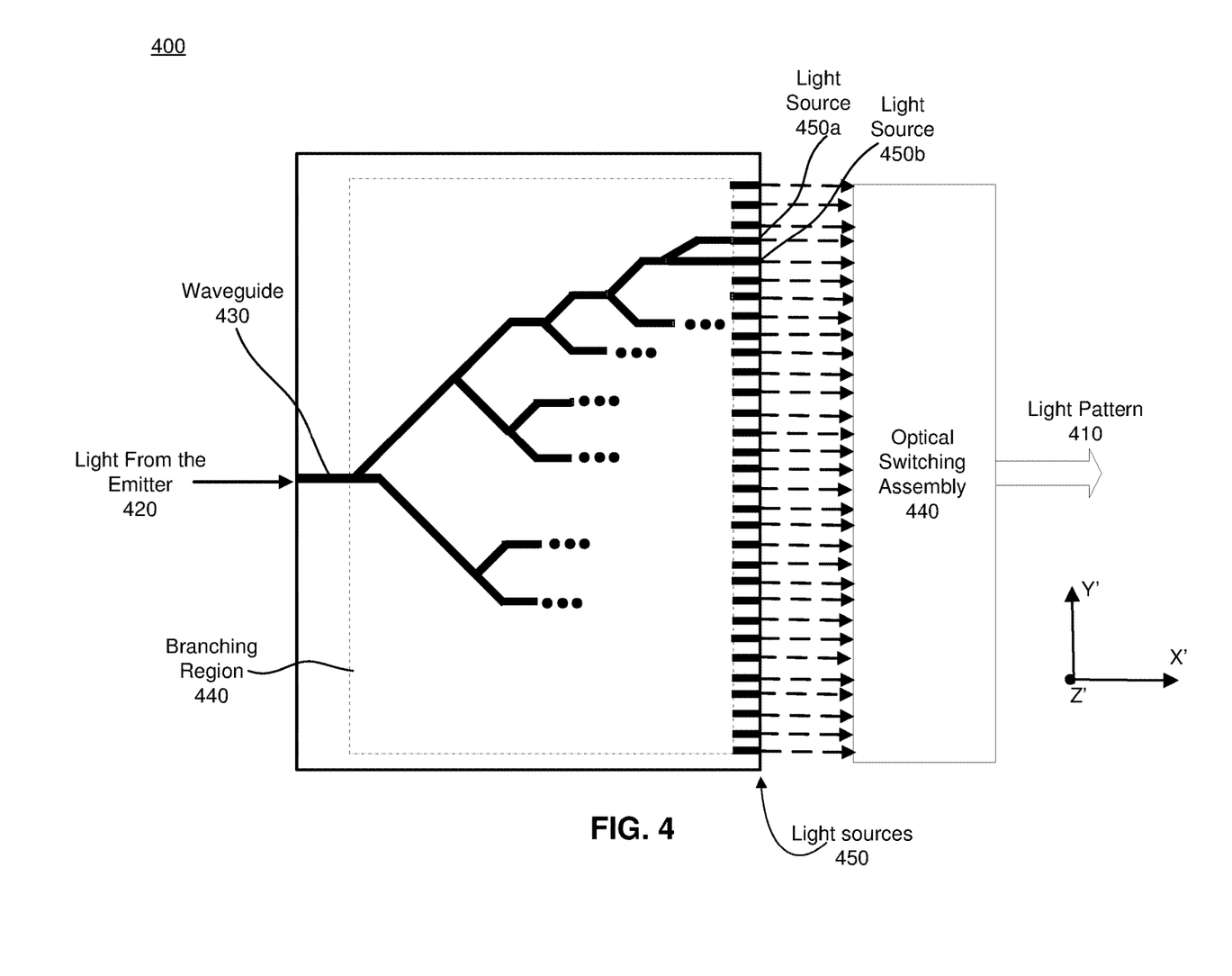
FIG. 4 is a top-down view of a photonic circuit, in accordance with one or more embodiments.

FIG. 4 is a top-down view of a photonic circuit 400, in accordance with one or more embodiments. The photonic circuit 400 generates a light pattern 410. The light pattern 410 may be a 1-D line source, a true linear source, and a source including some staggered sections of sources that are staggered linear segments, or a 2-D source. In some embodiments, the photonic circuit 400 may be substantially planar. The light pattern 410 may be monochromatic, or in some embodiments polychromatic. The photonic circuit 400 comprises the waveguide 430 and an optical switching assembly 440. In some embodiments, the photonic circuit 400 is a photonic circuit in the photonic array 350 described above in conjunction with FIG. 3 and/or a photonic circuit in the photonic array described below in conjunction with FIG. 5.

The waveguide 430 is a photonic structure that guides light using total internal reflection. In an embodiment, the waveguide 420 is a dielectric waveguides and confines light in 2D. For example, the waveguide 430 is a dielectric slab waveguide comprising a cladding constructed from a material with a high index of refraction such as silicon, silicon dioxide, silicon nitride, silicon, glass, ceramic or crystal media, etc. on a lower index substrate such as silicon, ceramic or crystal media, or glass. In other embodiments, the waveguide 430 is a dielectric ridge waveguide configured to propagate a transverse electric (TE) electromagnetic (EM) wave, a transverse magnetic (TM) EM wave, or some combination thereof via total internal reflection. In still other embodiment, the waveguide 430 is a photonic crystal or metamaterial waveguide comprising a plurality of submicron scale structures to provide for the mode confinement and needed tree branch structures. In various embodiments, the waveguide 430 is fabricated using lithographic methods in combination with, for example, epitaxy, ion exchange, or thermal diffusion. The waveguide 430 includes a branching region 440 and a plurality of light sources 450.

The waveguide 430 propagates light from the emitter 420 to the branching region 440 via, for example, total internal reflection, and mode confinement. The branching region 440 divides the received light into a number of channels (i.e., splits the light received from the waveguide 430 a plurality of times before outputting the light at the plurality of light sources 425). Each channel corresponds to an output of the branching region. Note that in the illustrated example, the light from the emitter 420 is split into 31 light sources along the Y' dimension. However, in other embodiments the light from the emitter 420 may be split into some other number of light sources in the dimension (more or less). For example, the light from the emitter 420 may be split into a 100 or more light sources along the Y' dimension in the branching region 440. In FIG. 4, the waveguide 430 in the branching region 440 splits the light using a bracket type structure. In other embodiments, the waveguide 430 in the branching region 440 splits the light using some other structure (e.g., a fishbone layout, a branched layout, or any combination thereof).

The waveguide 430 may be configured to propagate light in multiple bands of light. For example, if light from the emitter 420 comprises light in multiple bands of the electromagnetic spectrum (e.g., red, green, blue, infrared . . . etc.), the waveguide 430 is configured to output a light via the plurality of light sources (i.e., the light source 450a and the light 425b). In the example described directly above, the output light is input to the optical switching assembly 440.

The optical switching assembly 440 is configured to switch light emitted by the plurality of light sources (i.e., the light source 450a and the light source 450b). In one or more embodiments, the optical switching assembly 440 switches the light into one of an active state and an inactive state. In an embodiment, the optical switching assembly 440 operates by mechanical means (e.g., physically shifting a fiber). In other embodiments, the optical switching assembly 440 employs one or more electro-optic effects, magneto-optics effects, or some combination thereof. In still other embodiments, the optical switching assembly 440 may additionally perform one or more logic functions based on one or more display instructions from a controller (e.g., controller 3300. For example, the optical switching assembly 440 includes one or more semiconductor amplifiers and/or optical amplifiers. Generally, the optical switching assembly 440 includes a plurality of output ports and a one or more input ports. Each input port provides light to at least one (and in some cases more than one) corresponding output port. The optical switching assembly 440 is configured to form an optical connections between an input port and one or more corresponding output ports. The geometry of the switched light pattern (e.g., 1D or 2D) depends on the physical arrangement of the output ports. And the geometry of the output ports can vary from the geometry of the input ports. For example, the input ports could be arranged in 1D (i.e., a line), and the output ports could be arranged in 2D. The optical switching assembly 440 switches the light based on one or more display instruction from a controller. Each output port has a corresponding state that is set by the controller (e.g., controller 330). A state may be an active state or an inactive state. If an output port is in an active state, it transmits light from its corresponding input port. If an output port is in an inactive state, it does not transmit light from its corresponding input port. The controller is able to dynamically control which output ports emit light by controlling the state of each of the output ports.

In an embodiment, one or more photonic circuits 400 may be stacked on top of one another. The stack of photonic circuits 400 is configured to generate at least a portion of a 2D light pattern based on one or more display instructions from a controller. In some embodiments, a light pattern generated by the photonic circuit 400 is scanned in one or more dimensions by a scanning mirror assembly (e.g., scanning assembly 360) to generate an image light (e.g., image light 380). Generating an image light from a light pattern is further described above in conjunction with FIG. 3.

Figure 5:
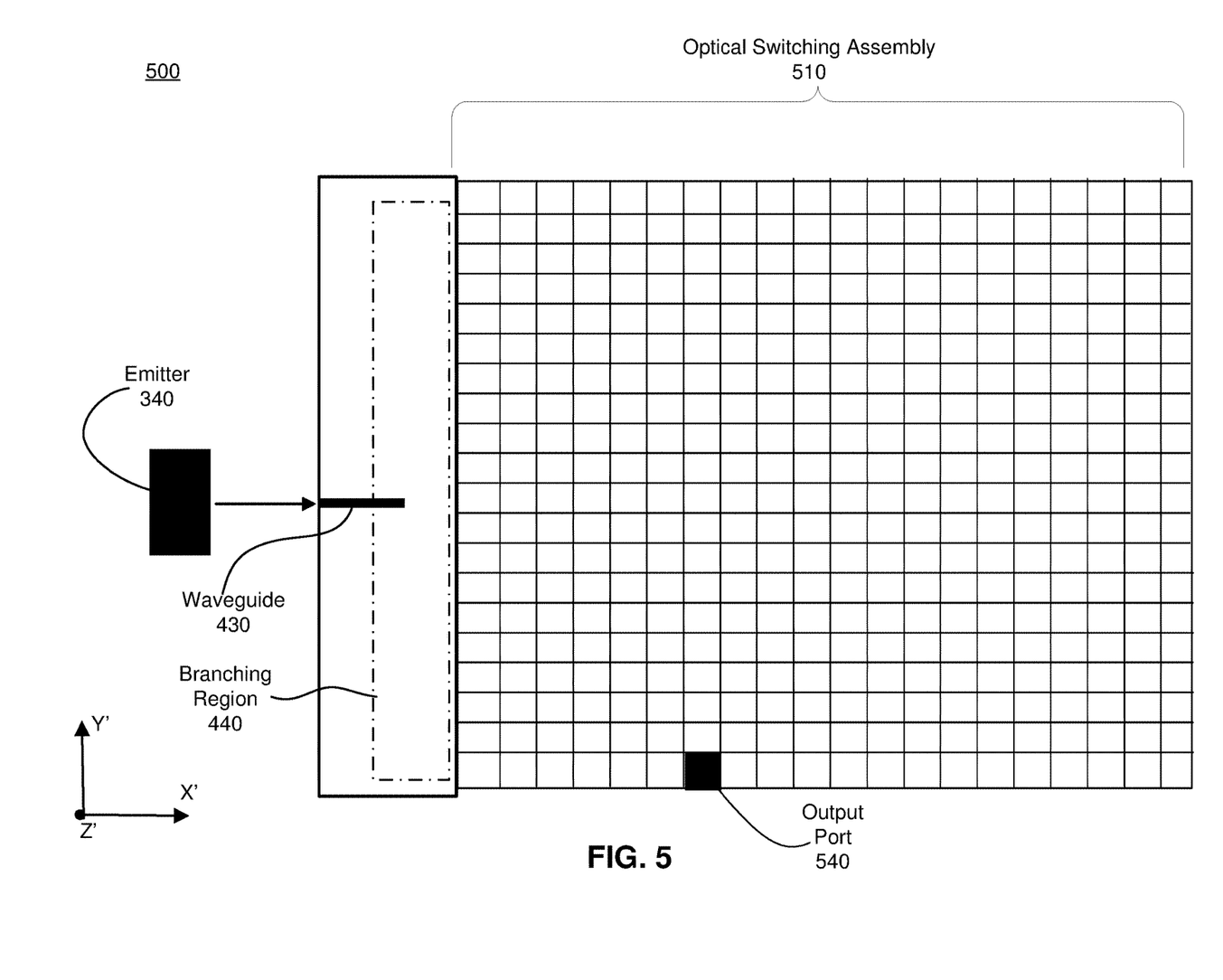
FIG. 5 is a top-down view of a photonic circuit, in accordance with an embodiment.

FIG. 5 is a top-down view of a photonic circuit 500, in accordance with an embodiment. In some embodiments, the photonic circuit 500 is a component of a photonic array (e.g., photonic array 350) of a NED (e.g., NED 200). In alternate embodiments, the photonic circuit 500 is part of some other NED 200, or other system that directs display image light to a particular location. The photonic circuit 500 includes an emitter 340, a waveguide 430, a branching region 440, and an optical switching assembly 510. The optical switching assembly 510 is substantially the same as the optical switching assembly 440 except that it emits in a light pattern in the Z' direction.

As illustrated in FIG. 5, the light from the emitter 340 is coupled into the waveguide 430 and is branched into a plurality of light sources associated with the photonic circuit 500 via the branching region 440. The light from the plurality of light sources associated with the branching region 440 is coupled into the optical switching assembly 510. Each of the plurality of light sources are respectively incoupled into an input port (not shown). The optical switching assembly 510 includes a plurality of output ports, and each output port functions as a particular pixel that is configured to emit light in the Z' dimension. As illustrated in FIG. 5, the geometry of the optical switching assembly 510 is such that there are 20 output port in each row, and there are 20 output ports in each column. In other embodiments, the geometry of the optical switching assembly 510 may be different. As noted above in the context of FIG. 4, a controller (e.g., controller 330) determines which of the plurality output ports are in an active state and which are in an inactive state. In the illustrated embodiment, all of the output ports are active (emitting light), except for an output port 540 which is in an inactive state (not transmitting light).

In some embodiments, the optical switching assembly 510 may be coupled to a plurality of waveguides (e.g., the waveguide 430). For example, each waveguide 430 may be for a different color channel (e.g., red, green, blue) and each of the plurality of waveguides is coupled to some number of input ports of the optical switching assembly 510. In this manner, the light pattern formed by the optical switching assembly 510 may be a polychromatic image.

In various embodiments, the light pattern is a portion of a complete 2D light pattern generated by the photonic circuit 500 is incident upon a scanning mirror (e.g., scanning assembly 360). Here, the scanning mirror is configured to scan the light emitted from the optical switching assembly 510 to form image light. In alternate embodiments, the light output from the optical switching assembly is directly incoupled into the output waveguide without scanning or is provided directly to the eyebox. In these cases the light pattern produced by the optical switching assembly corresponds to a complete image (v. a partial image that is scanned to form a complete image).

Figure 6:
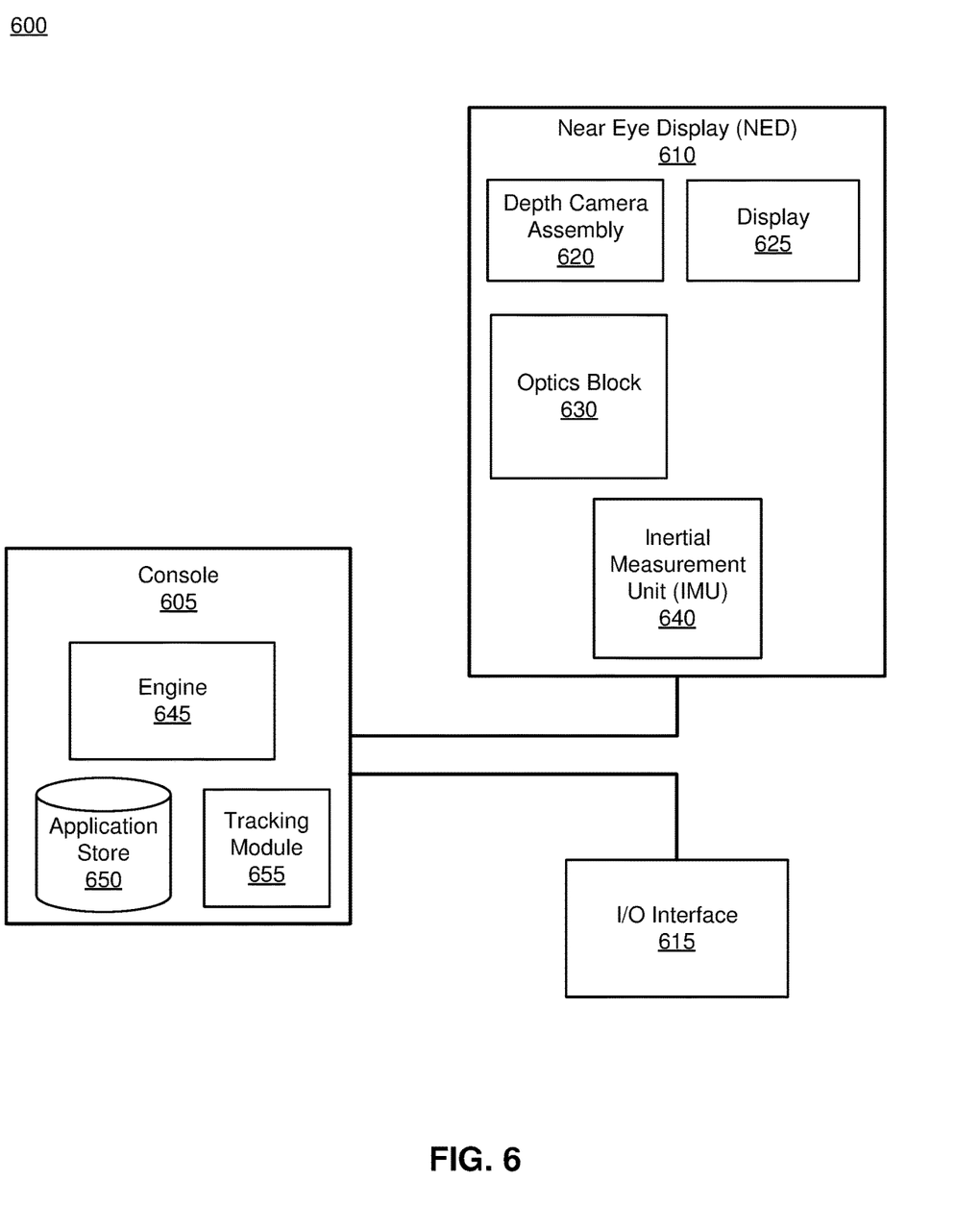
FIG. 6 is a block diagram of a system environment including an artificial reality system, in accordance with one or more embodiments.

FIG. 6 is a block diagram of a system environment 600 including an artificial reality system, in accordance with one or more embodiments. As used herein, the system 600 may also include system environments that present users with virtual environments with which the user may interact. The system 600 shown by FIG. 6 comprises a NED 610 and an input/output (I/O) interface 615 that is coupled to the console 605. While FIG. 6 shows an example system 600 including one NED 610 and one I/O interface 615, in other embodiments any number of these components may be included in the system 600. For example, there may be multiple NEDs 610 each having an associated I/O interface 615, with each NED 610 and I/O interface 615 communicating with the console 605. In alternative configurations, different and/or additional components may be included in the system environment 600. Additionally, functionality described in conjunction with one or more of the components shown in FIG. 6 may be distributed among the components in a different manner than described in conjunction with FIG. 6 in some embodiments. For example, some or all of the functionality of the console 605 is provided by the NED 610.

The NED 610 is a head-mounted display that presents content to a user comprising virtual and/or augmented views of a physical, real-world environment with computer-generated elements (e.g., 2D or three dimensional (3D) images, 2D or 3D video, sound, etc.). In some embodiments, the presented content includes audio that is presented via an external device (e.g., speakers and/or headphones) that receives audio information from the NED 610, the console 605, or both, and presents audio data based on the audio information. The NED 610 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The NED 610 includes a depth camera assembly (DCA) 620, a display 625, an optics block 630, and an inertial measurement Unit (IMU) 640. Some embodiments of The NED 610 have different components than those described in conjunction with FIG. 6. Additionally, the functionality provided by various components described in conjunction with FIG. 6 may be differently distributed among the components of the NED 610 in other embodiments.

The DCA 620 captures data describing depth information of an area surrounding the NED 610. The data describing depth information may be associated with one or a combination of the following techniques used to determine depth information: stereo vision, photometric stereo, structured light (SL), and time of flight (ToF). The DCA 620 can compute the depth information using the data, or the DCA 620 can send this information to another device such as the console 605 that can determine the depth information using data from the DCA 620.

The display 625 displays 2D or 3D images to the user in accordance with data received from the console 605. In various embodiments, the display 625 comprises a display assembly that includes one or more waveguide displays. A waveguide display includes an illumination source, an output waveguide, and a controller. In an embodiment, the illumination source includes one or more emitters, a photonic array. In various embodiments, the illumination source also includes a scanning assembly. The one or more emitters provides light to the photonic array. The photonic array generates a light pattern (e.g., 1D or 2D). In some embodiments, the light pattern may be directly incoupled to the output waveguide or the eyebox without scanning.

In other embodiments, the light pattern is scanned to form the image light in accordance with instructions from the controller. The generated image light is coupled into the output waveguide. The output waveguide expands the image light (e.g., via pupil replication) in at least one dimension and propagates the expanded image light towards an eye of a user. Embodiments of the illumination source, the optical waveguide, the photonic array, and the controller are described above in conjunction with FIGS. 3-5.

The optics block 630 magnifies image light received from the display 625, corrects optical errors associated with the image light, and presents the corrected image light to a user of the NED 610. The optics block 630 includes a plurality of optical elements. Example optical elements included in the optics block 630 include: an aperture, a Fresnel lens, a convex lens, a concave lens, a filter, a reflecting surface, or any other suitable optical element that affects image light. Moreover, the optics block 630 may include combinations of different optical elements. Examples of optical elements include quarter waveplates, half waveplates, and full waveplate. In some embodiments, one or more of the optical elements in the optics block 630 may have one or more coatings, such as partially reflective or anti-reflective coatings.

In some embodiments, the optics block 630 may be, additionally, configured to correct one or more types of optical error. Examples of optical error include barrel or pincushion distortions, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the display 625 for display is pre-distorted, and the optics block 630 corrects the distortion when it receives image light from the display 625 generated based on the content.

The IMU 640 is an electronic device that generates data indicating a position of the NED 610 based on measurement signals received from one or more of the position sensors associated with the IMU 640 and from depth information received from the DCA 620. A position sensor generates one or more measurement signals in response to motion of the NED 610. Examples of position sensors include: one or more accelerometers, one or more gyroscopes, one or more magnetometers, another suitable type of sensor that detects motion, a type of sensor used for error correction of the IMU 640, or some combination thereof.

Based on the one or more measurement signals from one or more position sensors, the IMU 640 generates data indicating an estimated current position of the NED 610 relative to an initial position of the NED 610. For example, the position sensors include multiple accelerometers to measure translational motion (forward/back, up/down, left/right) and multiple gyroscopes to measure rotational motion (e.g., pitch, yaw, and roll). In some embodiments, the IMU 640 rapidly samples the measurement signals and calculates the estimated current position of the NED 610 from the sampled data. For example, the IMU 640 integrates the measurement signals received from the accelerometers over time to estimate a velocity vector and integrates the velocity vector over time to determine an estimated current position of a reference point on the NED 610. Alternatively, the IMU 640 provides the sampled measurement signals to the console 605, which interprets the data to reduce error. The reference point is a point that may be used to describe the position of the NED 610. The reference point may generally be defined as a point in space or a position related to the NED's 610 orientation and position.

The IMU 640 receives one or more parameters from the console 605. As further discussed below, the one or more parameters are used to maintain tracking of the NED 610. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the NED 610, the IMU 640 may be a dedicated hardware component. In other embodiments, the IMU 640 may be a software component implemented in one or more processors.

The I/O interface 615 is a device that allows a user to send action requests and receive responses from the console 605. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 605. An action request received by the I/O interface 615 is communicated to the console 605, which performs an action corresponding to the action request. In some embodiments, the I/O interface 615 includes an IMU 640, as further described above, that captures calibration data indicating an estimated position of the I/O interface 615 relative to an initial position of the I/O interface 615. In some embodiments, the I/O interface 615 may provide haptic feedback to the user in accordance with instructions received from the console 605. For example, haptic feedback is provided when an action request is received, or the console 605 communicates instructions to the I/O interface 615 causing the I/O interface 615 to generate haptic feedback when the console 605 performs an action.

The console 605 provides content to the NED 610 for processing in accordance with information received from one or more of: the DCA 620, the NED 610, and the I/O interface 615. In the example shown in FIG. 6, the console 605 includes an engine 645, application store 650, and a tracking module 655. Some embodiments of the console 605 have different modules or components than those described in conjunction with FIG. 6. Similarly, the functions further described below may be distributed among components of the console 605 in a different manner than described in conjunction with FIG. 6.

The application store 650 stores one or more applications for execution by the console 605. An application is a group of instructions, that when executed by a processor, generates content for presentation to the user. Content generated by an application may be in response to inputs received from the user via movement of the NED 610 or the I/O interface 615. Examples of applications include: gaming applications, conferencing applications, video playback applications, or other suitable applications.

The tracking module 655 calibrates the system environment 600 using one or more calibration parameters and may adjust one or more calibration parameters to reduce error in determination of the position of the NED 610 or of the I/O interface 615. For example, the tracking module 655 communicates a calibration parameter to the DCA 620 to adjust the focus of the DCA 620 to more accurately determine positions of SL elements captured by the DCA 620. Calibration performed by the tracking module 655 also accounts for information received from the IMU 640 in the NED 610 and/or an IMU 640 included in the VR I/O interface 615. Additionally, if tracking of the NED 610 is lost (e.g., the DCA 620 loses line of sight of at least a threshold number of SL elements), the tracking module 655 may re-calibrate some or all of the system environment 600.

The tracking module 655 tracks movements of the NED 610 or of the I/O interface 615 using information from the DCA 620, one or more position sensors associated with the NED 610 (not shown), the IMU 640, or some combination thereof. For example, the tracking module 655 determines a position of a reference point of the NED 610 in a mapping of a local area based on information from the NED 610. The tracking module 655 may also determine positions of the reference point of the NED 610 or a reference point of the I/O interface 615 using data indicating a position of the NED 610 from the IMU 640 or using data indicating a position of the I/O interface 615 from an IMU 640 included in the I/O interface 615, respectively. Additionally, in some embodiments, the tracking module 655 may use portions of data indicating a position or the NED 610 from the IMU 640 as well as representations of the local area from the DCA 620 to predict a future location of the NED 610. The tracking module 655 provides the estimated or predicted future position of the NED 610 or the I/O interface 615 to the engine 645.

The engine 645 generates a 3D mapping of the area surrounding the NED 610 (i.e., the "local area") based on information received from the NED 610. In some embodiments, the engine 645 determines depth information for the 3D mapping of the local area based on information received from the DCA 620 that is relevant for techniques used in computing depth. The engine 645 may calculate depth information using one or more techniques in computing depth (e.g., stereo vision, photometric stereo, SL, ToF, or some combination thereof). In various embodiments, the engine 645 uses different types of information determined by the DCA 620 or a combination of types of information determined by the DCA 620. The engine 645 may provide one or more display instructions to the display 625.

The engine 645 also executes applications within the system 600 and receives position information, acceleration information, velocity information, predicted future positions, or some combination thereof, of the NED 610 from the tracking module 655. Based on the received information, the engine 645 determines content to provide to the NED 610 for presentation to the user. For example, if the received information indicates that the user has looked to the left, the engine 645 generates content for the NED 610 that mirrors the user's movement in a virtual environment or in an environment augmenting the local area with additional content. Additionally, the engine 645 performs an action within an application executing on the console 605 in response to an action request received from the I/O interface 615 and provides feedback to the user that the action was performed. The provided feedback may be visual or audible feedback via the NED 610 or haptic feedback via the I/O interface 615.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near eye display (NED) comprising:
an emitter configured to emit light; and
a photonic array comprising:
a waveguide including an input and a plurality of outputs, the waveguide configured to receive the light at the input, divide the received light into a number of channels, and output the divided light using at least some of the plurality of outputs, and
an optical switching assembly including:
a plurality of input ports configured to incouple the light from the plurality of outputs, and
a plurality of output ports that receive the incoupled light from the plurality of input ports, the plurality of output ports configured to selectively output the incoupled light in accordance with instructions that control a respective state of each of the plurality of output ports, the respective state for each output port controlling an amount of light output by that output port.

2. The NED of claim 1, wherein the first emitter emits light in a first band, and the NED further comprises:
a second emitter that emits light in a second band that is different than the first band; and
a second waveguide including a second input and a second plurality of outputs, the second waveguide configured to receive the light in the second band at the second input, divide the received light in the second band into a number of channels, and output the divided light in the second band using at least some of the second plurality of outputs.

3. The NED of claim 2, further comprising:
a second optical switching assembly that includes a second plurality of input ports and a second plurality of output ports, the second optical switching assembly configured to incouple the light in the second band from the second plurality of outputs at corresponding input ports of the second plurality of input ports, and selectively output some or all of the incoupled light via output ports of the second plurality of output ports in accordance with instructions from a controller.

4. The NED of claim 2, wherein the optical switching assembly is configured to incouple the light in the second band from the second plurality of outputs at corresponding input ports of the plurality of input ports, and selectively output some or all of the incoupled light via output ports of the plurality of output ports in accordance with instructions from a controller.

5. The NED of claim 1, wherein the light output from at least some of the output ports forms a line source.

6. The NED of claim 1, wherein the emitter is selected from a group consisting of: a vertical cavity surface-emitting laser (VCSEL), a VCSEL array, a diode laser, a multiple-emitter diode laser, and micro light emitting diodes (microLED).

7. The NED of claim 1, wherein the light output from at least some of the output ports forms a light pattern, the NED further comprising:
a scanning assembly configured to scan the light pattern in at least one dimension in order to generate image light; and
an output waveguide configured to receive the image light, expand the image light in at least one dimension, and output the expanded image light towards an eyebox of the NED.

8. The NED of claim 1, wherein the waveguide includes a branching region that is configured to divide the received light into the number of channels, using a layout selected from a group consisting of: a branched layout, and a fishbone layout.

9. The NED of claim 1, wherein the light output from at least some of the output ports forms a 2-dimensional (2D) light pattern, the NED further comprising:
a scanning assembly configured to scan the 2D light pattern in at least one dimension in order to generate image light; and
an output waveguide configured to receive the image light, expand the image light in at least one dimension, and output the expanded image light towards an eyebox of the NED.

10. The NED of claim 1, wherein the light output from at least some of the output ports forms a 2-dimensional (2D) light pattern, the NED further comprising:
an output waveguide configured to receive the 2D light pattern, expand the 2D light pattern in at least one dimension, and output the expanded 2D light pattern towards an eyebox of the NED.

11. A photonic array comprising:
a waveguide including an input and a plurality of outputs, the waveguide configured to receive light at the input, divide the received light into a number of channels, and output the divided light using at least some of the plurality of outputs; and
an optical switching assembly including:
a plurality of input ports configured to incouple the light from the plurality of outputs, and
a plurality of output ports that receive the incoupled light from the plurality of input ports, the plurality of output ports configured to selectively output the incoupled light in accordance with instructions that control a respective state of each of the plurality of output ports, the respective state for each output port controlling an amount of light output by that output port.

12. The photonic array of claim 11, wherein the light is in a first band, and the photonic array further comprises:
a second waveguide including a second input and a second plurality of outputs, the second waveguide configured to receive light in a second band at the second input, divide the received light in the second band into a number of channels, and output the divided light in the second band using at least some of the second plurality of outputs.

13. The photonic array of claim 12, further comprising:
a second optical switching assembly that includes a second plurality of input ports and a second plurality of output ports, the second optical switching assembly configured to incouple the light in the second band from the second plurality of outputs at corresponding input ports of the second plurality of input ports, and selectively output some or all of the incoupled light via output ports of the second plurality of output ports in accordance with instructions from a controller.

14. The photonic array of claim 12, wherein the optical switching assembly is configured to incouple the light in the second band from the second plurality of outputs at corresponding input ports of the plurality of input ports, and selectively output some or all of the incoupled light via output ports of the plurality of output ports in accordance with instructions from a controller.

15. The photonic array of claim 11, wherein the light output from at least some of the output ports forms a line source.

16. The photonic array of claim 11, wherein the waveguide includes a branching region that is configured to divide the received light into the number of channels, using a layout selected from a group consisting of: a branched layout, and a fishbone layout.

17. A near eye display (NED) comprising:
a photonic array comprising:
a waveguide including an input and a plurality of outputs, the waveguide configured to receive light at the input, divide the received light into a number of channels, and output the divided light using at least some of the plurality of outputs, and
an optical switching assembly including:
a plurality of input ports configured to incouple the light from the plurality of outputs, and
a plurality of output ports that receive the incoupled light from the plurality of input ports, the plurality of output ports configured to selectively output the incoupled light in accordance with instructions that control a respective state of each of the plurality of output ports, the respective state for each output port controlling an amount of light output by that output port.

18. The NED of claim 17, wherein the light output from at least some of the output ports forms a light pattern, the NED further comprising:
a scanning assembly configured to scan the light pattern in at least one dimension in order to generate image light; and
an output waveguide configured to receive the image light, expand the image light in at least one dimension, and output the expanded image light towards an eyebox of the NED.

19. The NED of claim 17, wherein the light output from at least some of the output ports forms a 2-dimensional (2D) light pattern, the NED further comprising:
a scanning assembly configured to scan the 2D light pattern in at least one dimension in order to generate image light; and
an output waveguide configured to receive the image light, expand the image light in at least one dimension, and output the expanded image light towards an eyebox of the NED.

20. The NED of claim 17, wherein the light output from at least some of the output ports forms a 2-dimensional (2D) light pattern, the NED further comprising:
an output waveguide configured to receive the 2D light pattern, expand the 2D light pattern in at least one dimension, and output the expanded 2D light pattern towards an eyebox of the NED.

* * * * *